United States Patent [19]
Chaudhuri

[11] Patent Number: 5,598,559
[45] Date of Patent: Jan. 28, 1997

[54] METHOD AND APPARATUS FOR OPTIMIZING QUERIES HAVING GROUP-BY OPERATORS

[75] Inventor: Surajit Chaudhuri, Palo Alto, Calif.

[73] Assignee: Hewlett-Packard Company, Palo Alto, Calif.

[21] Appl. No.: 653,804

[22] Filed: May 28, 1996

Related U.S. Application Data

[63] Continuation of Ser. No. 270,209, Jul. 1, 1994, abandoned.

[51] Int. Cl.⁶ .................................................. G06F 17/30
[52] U.S. Cl. ................................ 395/602; 364/DIG. 1; 364/282.1; 364/283.4
[58] Field of Search ............................................. 395/600

[56] References Cited

U.S. PATENT DOCUMENTS

| | | | |
|---|---|---|---|
| 5,448,727 | 9/1995 | Annenelink | 395/600 |
| 5,469,568 | 11/1995 | Schiefer et al. | 395/600 |
| 5,495,605 | 2/1996 | Cadot | 395/600 |

*Primary Examiner*—Wayne Amsbury

[57] ABSTRACT

A method and apparatus for optimizing a query for a relational database are disclosed. The techniques employed enable a group-by operator to be an internal node. In particular, the optimization techniques include the steps of receiving a query having group-by to be optimized, generating for the query execution plans where placing group-by preceding every internal join node are considered, estimating cost for the execution plans, and choosing the execution plan having the lowest estimated cost.

7 Claims, 8 Drawing Sheets

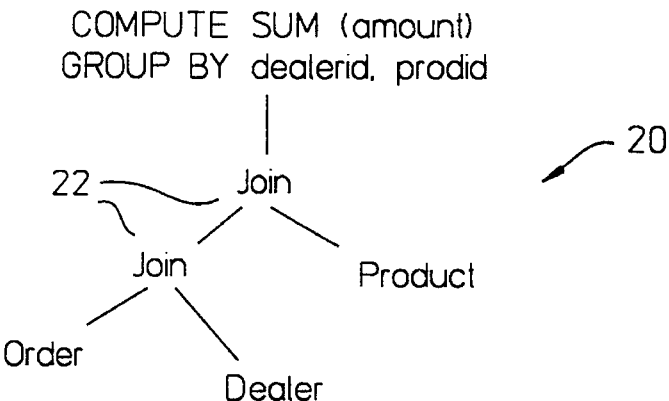
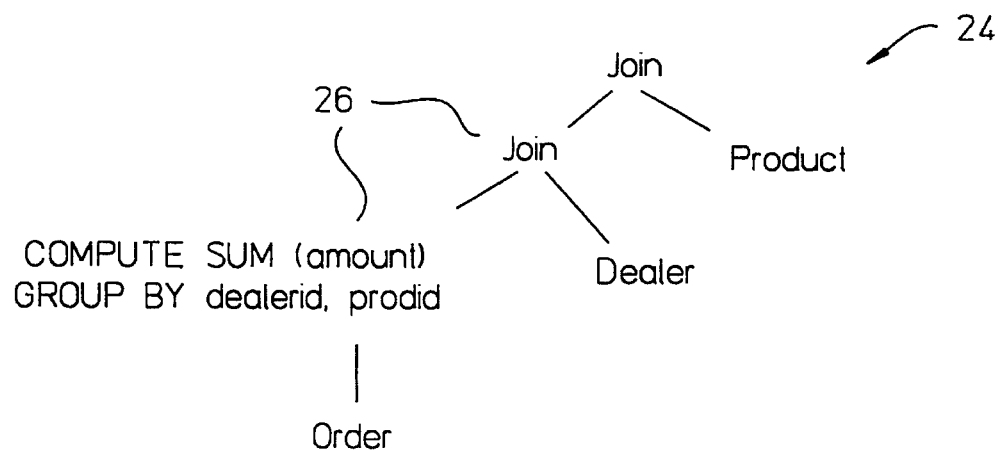
FIG. 2
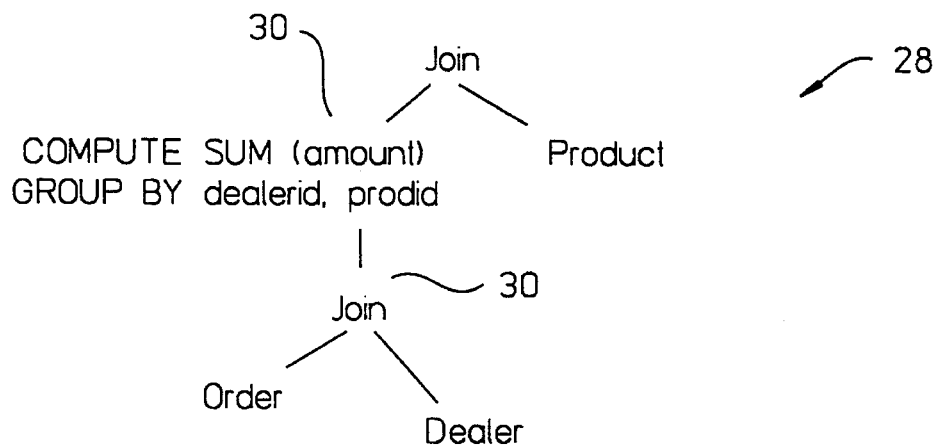
FIG. 3A
FIG. 3B

METHOD AND APPARATUS FOR OPTIMIZING QUERIES HAVING GROUP-BY OPERATORS

CROSS REFERENCE TO RELATED APPLICATION(S)

This is a continuation of application Ser. No. 08/270,209 filed on Jul. 1, 1994, now abandoned.

BACKGROUND OF THE INVENTION

1. Field of the Invention

The present invention relates to techniques for optimizing database queries and, more particularly, to a method and apparatus for optimizing queries having group-by operators.

2. Description of the Related Art

Performance of databases is largely dependent on the ability of the database system to optimize query execution. Query execution is optimized in databases by preprocessing the query to place it in a form which can be more efficiently executed by the database system. The optimization process selects an execution plan which is most efficient.

One problem with conventional approaches is that they have failed to adequately optimize queries having group-by operators. The conventional approaches perform the group-by operation after all the join operations have been evaluated. See, e.g., A. Klug, *Access Paths in the ABE Statistical Query Facility,* Proceedings of 1982 ACM-SIGMOD Conference on the Management of Data; U. Dayal, *Of Nests and Trees. A Unified Approach to Processing Queries that contain subqueries, aggregates and quantifies,* Proceedings of the 13th VLDB, 1987; and Selinger P. G. et al., *Access Path Selection in a Relational Database Management System,"* Proceedings of ACM-SIGMOD Conference on the Management of Data, June 1979, pp. 23–34. Accordingly, most conventional approaches have not considered or realized the benefits of transformations when grouping precedes join to reduce the size of the relation and possibly the cost of the join.

Recently, a transformation that enables pushing a group-by operator past a join operation was discovered. See, e.g., W. Yan and P Larson, *Performing Group-By before Join,* International Conference on Data Engineering, 1993. The approach is based on partitioning relations in the given query in two groups so as to form two queries. The result of the given query is eventually obtained by joining the results of the two queries. But, as a price for pushing the group-by operation past a join operation, the space of choice for join ordering is reduced because the ordering of relations is considered only within a partition. Moreover, given a query, there is a unique placement for the group-by operator. Thus, the transformation utilized by Yan and Larson fails to capture alternative execution plans which are possible and sometimes preferred (because they result in more efficient execution).

Therefore, there is a need for a robust technique to optimize queries having group-by operators.

SUMMARY OF THE INVENTION

Broadly speaking, the invention optimizes a query for a database by enabling a group-by operator to be an internal node of execution plans. An execution plan is a specification for the order in which operations are performed in the processing a query. The execution plan is a tree data structure, wherein each leaf-node is a scan operation and each internal node represents an operation to be performed and wherein the execution of an operation represented by a given node is always preceded by the execution of the operations represented by the children of the given node. According to the invention, in a relational database management system a query having at least one Group-By operator is optimized. The optimization procedure includes the steps of receiving a query having a group-by operator to be optimized, generating for the query execution plans wherein internal nodes representing group-by operations are placed preceding every internal node representing a join operation, considering each such execution plan, and choosing the execution plan having the lowest estimated cost. The invention can also be implemented as an apparatus.

The invention is advantageous because it provides a robust technique to optimize group-by operators. As a result, an optimizer is able to operate more efficiently because it is provided with significantly better choice of execution plans for the query.

Other aspects and advantages of the invention will become apparent from the following detailed description, taken in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 2 is a schematic diagram of a representative conventional left-deep join tree execution plan;

FIGS. 3A and 3B are schematic diagrams of representative extended left-deep join trees for the join tree illustrated in FIG. 2;

DETAILED DESCRIPTION OF THE INVENTION

Embodiments of the invention are discussed below with reference to FIGS. 1–10. However, those skilled in the art will readily appreciate that the detailed description given herein with respect to these figures is for explanatory purposes as the invention extends beyond these limited embodiments.

Figure 1:
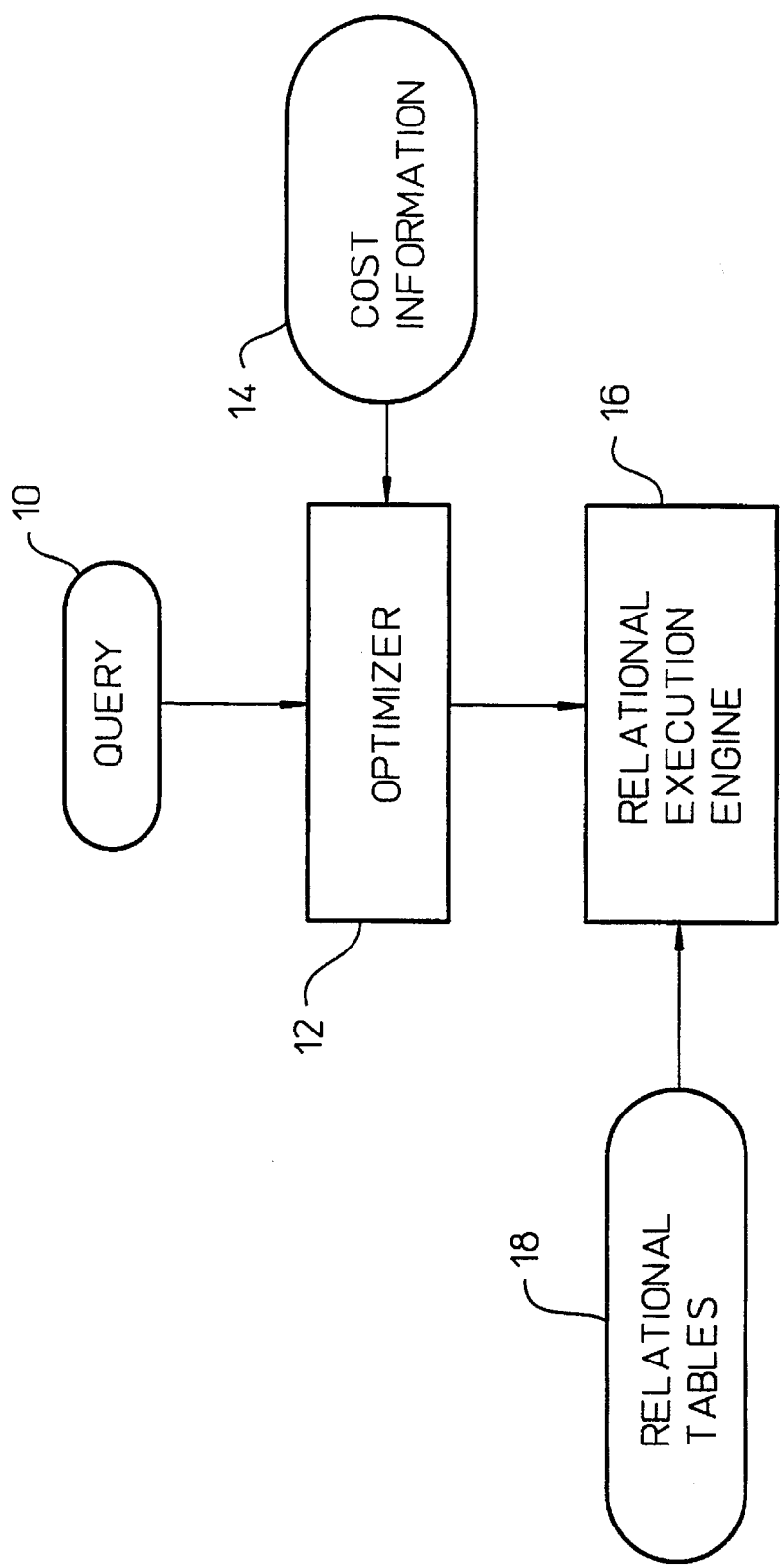
FIG. 1 is a block diagram of a relational database management system according to the invention.

The invention concerns a relational database system which includes method and apparatus for optimizing queries having group-by operators. FIG. 1 is a block diagram illustrating a relational database management system 2 according to the invention. The relational database management system 2 receives a query 10 which is to be optimized. The query 10 is supplied to an optimizer 12 which optimizes the query 10 in accordance with cost information 14. Generally speaking, the optimizer 12 receives the query to be processed, generates alternative execution plans, and then selects an optimal plan. The relational database management system 2 also includes a relational execution engine 16 which accesses relational database tables 18 when processing the query 10 in accordance with the selected optimal plan.

A representative query is a single block SQL query such as indicated below.

SELECT ALL <columnlist> AGG1(b1) . . . AGGn(bn)

FROM <tablelist>

WHERE cond1 AND cond2 . . . AND condn

GROUP BY col1 . . . colj

The WHERE clause of each query is a conjunction of simple predicates. SQL semantics require that <columnlist> must be among col1, . . . , colj. AGG1, . . . , AGGn represent built-in SQL aggregate functions. The set of columns b1, . . . , bn are aggregating columns of the query. The set of columns col1, . . . , colj are called grouping columns of the query. Here, it is assumed that the aggregates have one of the following forms: Sum(colname); Max(colname); or Min(colname).

For the purpose of illustrating operation of the invention, two representative queries are used over a database that includes information on a corporation and its business. The company has a set of business divisions, each division belongs to a sector, and each product belongs to a division. An order is placed by a dealer. For every order, the amount and the date of sale are registered. For every dealer, the state and the street address are recorded. This database is represented using of the following four relations. For each relation, the first attribute represents the key:

Relation Division with two attributes divid, sectorid

Relation Product with two atttributes prodid, divid

Relation Order with five attributes orderid, prodid, dealerid, amount, date

Relation Dealer with three attributes dealerid, state, address

The first representative query Q1 is as follows:

SELECT ALL Sum (amount)

FROM Order, Dealer, Product

WHERE Order.dealerid=Dealer.dealerid AND Order.prodid=Product.prodid

GROUP BY Order.dealerid, Order.prodid

The second representative query Q2 is as follows:

SELECT ALL Sum (amount)

FROM Order, Product, Division

WHERE Product.divid=Division.divid AND Order.prodid=Product.prodid

GROUP BY Division.sectorid

Since the invention concerns the properties of group-by operators, the following annotations of a group-by operator are utilized: (i) grouping columns, (ii) aggregating columns, and (iii) aggregating functions. The meaning of these annotations are well understood in the database field. Although there are more annotations, they are not germane to the discussion here.

A traditional execution plan for a query can be represented syntactically as an annotated join tree where the root is a group-by operation and each leaf node is a scan operation. Conventionally, the internal nodes of the annotated join trees always represented join operations. The annotations of a join node include the choice of join method, as well as selection conditions and projection attributes. The selection conditions and projections are applied as early as possible. FIG. 2 is a schematic diagram of a conventional left-deep join tree 20 for the first representative query Q1. As is typical, the internal nodes 22 of the conventional left-deep join tree 20 are join operations.

In contrast to conventional approaches, the invention enables a group-by operation to be an internal node. Thus, the term "extended annotated join trees" is used to refer to annotated join trees in which a node representing a group-by operation may also occur as an internal node. Likewise, extended left-deep join trees are left-deep join trees in which a group-by operation may also occur as an internal node. FIGS. 3A and 3B are schematic diagrams of extended left-deep join trees 24, 28 with group-by operations occurring at internal nodes 26, 30 in these trees 24, 28. For brevity, the scan nodes illustrated in FIGS. 2, 3A and 3B are marked by the name of the relation.

In the description that follows, for the sake of brevity and readability, wherever a node representing an operation is located in an execution plan, such a node is referred to by the operation it represents. For example, "group-by node" refers to "a node representing a group-by operation" and "multiple group-by operations in the extended left-deep tree" means "multiple nodes representing group-by operations in the extended left-deep tree". In FIGS. 2, 3, 3, 5, and 6 a node bearing the word "join" represents a join operation, and a node bearing a group-by operator a group-by operation.

A join column of a node n is a column that participates in a join predicate which is evaluated at some ancestor node of n. A required column of a node n is either a join column of the node n or a grouping column of the query. A candidate aggregating column of a node n is a column of the node which is an aggregating column of the query but not a required column.

If a group-by node is to be introduced immediately above a node n in a leftdeep tree, it must have the following annotations: (i) the set of grouping columns is the set of required columns of n; and (ii) the set of aggregating columns is the set of candidate aggregating columns of n. For example, in the tree 24 shown in FIG. 3A, the required columns of the scan node Order are {dealerid, prodid}, and the candidate aggregating column for the scan node Order is {amount}.

Two annotated join trees are equivalent for a given schema (e.g., tables and columns of a stored database) if they result in the same answers over any database. The invention identifies transformations which enable derivation of equivalent left-deep trees from a given left-deep tree. Such transformations are described below.

In the first transformation (Invariant Grouping Property), the extended left-deep tree is obtained by moving the position of the group-by operations. In the second transformation (Simple Coalescing Grouping Property), a single group-by operations in the left-deep tree is replaced by multiple group-by operations in the extended left-deep tree.

Figure 4:
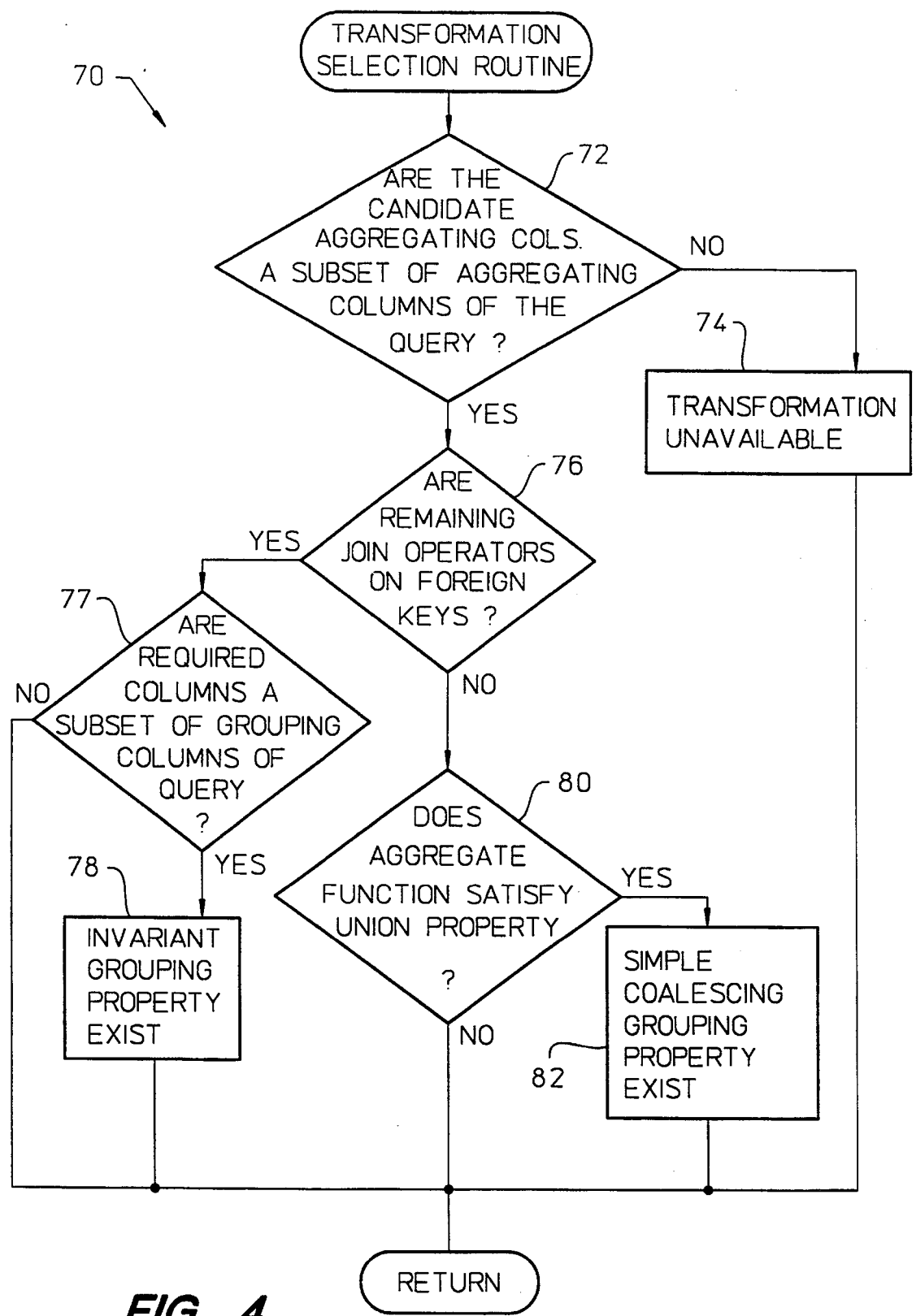
FIG. 4 is a flowchart of a transformation selection routine according to an embodiment of the invention.

FIG. 4 is a flowchart of a transformation selection routine 70 according to an embodiment of the invention. Given a node in a given left-deep tree, the purpose of the routine is to identify whether the node satisfies the invariant grouping or simple coalescing property. Initially, the transformation selection routine 70 determines 72 whether the set of candidate aggregating columns is a subset of the set of aggregating columns of the query. If the candidate aggregating columns are not among the aggregating columns of the query, then no transformations 74 are available for the group-by operations and the routine 70 ends. On the other hand, if candidate aggregating columns are a subset of the aggregating columns of the query, then the routine 70 determines 76 whether the remaining join operators (i.e., join operations occurring at the higher levels in the query tree) are on foreign keys. In other words, the remaining joins are equi-joins on the key columns of the other relation. If the remaining join operators operate on foreign keys, then the routine 70 determines 77 whether the required columns are a subset of the set of grouping columns of the query. Is so, then the invariant grouping property exists 78 and the routine 70 ends; otherwise, the routine 70 simply ends with neither of the transformations for group-by operators being available. On the other hand, if the remaining join operations do not operate only on foreign keys, then the routine 70 determines 80 whether the aggregate functions satisfy a union property. The union property is described below. If the aggregate functions of the query satisfy the union property, then the simple coalescing grouping property exists 82 and the routine 70 ends. Otherwise, when the aggregate functions do not satisfy the union property, the routine 70 simply ends with neither of the transformations for group-by operations being available.

The first transformation identifies one or more internal nodes n of a given left-deep tree (i.e., the nodes where the invariant grouping property holds) such that an equivalent extended left-deep tree is obtained from the given left-deep tree by moving the node representing the group-by operation to just above such a node n. This transformation is called invariant because the transformation retains the specification of the group-by operation (in the given left-deep tree) without modification (see FIGS. 3A and 3B).

A node n of a given left-deep tree has the invariant grouping property if the following conditions are true: (i) the required columns of n are the grouping columns of the query; (ii) all aggregating columns of the query are candidate aggregating columns of n; and (iii) for every join-node that is an ancestor of n, the join is an equi-join predicate on the foreign key of the inner relation in the join.

Further, it follows that if a node n in a left-deep tree has the invariant grouping property, then its ancestors also have the invariant grouping property. A set of nodes which have the invariant grouping property form a chain and an equivalent extended annotated join tree may be obtained by placing a node representing the group-by operations above any one of the nodes in the chain. Note that placing a group-by operation at multiple nodes with the invariant grouping property is redundant.

The second transformation also exploits opportunities for performing early grouping, but may require additional grouping subsequently where multiple groups formed earlier may need to be coalesced. Thus, as a consequence of a transformation based on simple coalescing, a group-by operation in a left-deep tree may be replaced by multiple group-by operations in the resulting extended left-deep join trees. Nonetheless, such transformations often help obtain execution plans that are superior to a plan produced by a traditional optimizer by an order of magnitude.

In the case of the second transformation (i.e., simple coalescing grouping property), conditions (ii) and (iii) for the invariant grouping no longer need be met. When condition (ii) or (iii) is not met, the tuple corresponding to the coalesced group may result in more than one tuples in the output relation that agree on the grouping columns of the query.

Therefore, to push down group-by operations where conditions (ii) and/or (iii) for the invariant grouping are not true, it must be possible to coalesce two groups that agree on the grouping column. Fortunately, for the built-in SQL aggregate functions Agg (e.g., Sum ), the aggregates of a bag of tuples may be computed from the aggregates computed from partitions of the bag $$Agg(Agg(S), Agg(S')) = Agg(S \cup S') \text{ [Union Property]} \quad (1)$$

where S and S' are arbitrary bags and $\cup$ denotes union of the bags. Thus, another application of a group-by operation can coalesce two groups.

Accordingly, a node n in a given a left-deep tree has simple coalescing grouping property if all aggregating columns of the query are candidate aggregating columns of the node n and the aggregates satisfy the union property (equation (1)). If a node has the simple coalescing grouping property, then so does all its ancestors in the left-deep join tree. Placing group-by operations on one or more nodes along a chain of nodes with simple coalescing grouping property leaves the new extended left-deep tree equivalent to the given one.

Figure 5:
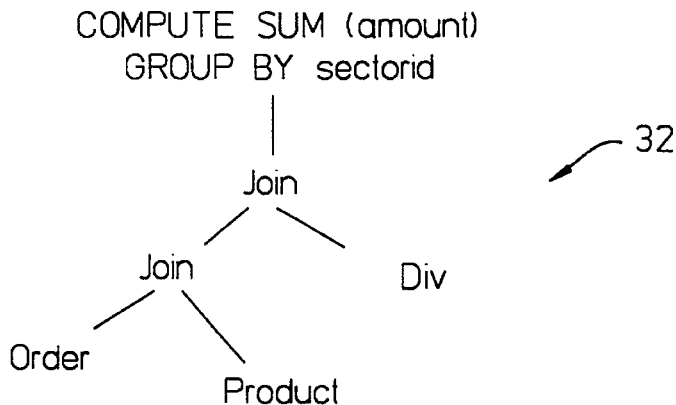
FIG. 5 is a schematic diagram of another representative conventional left-deep join tree.
Figure 6A:
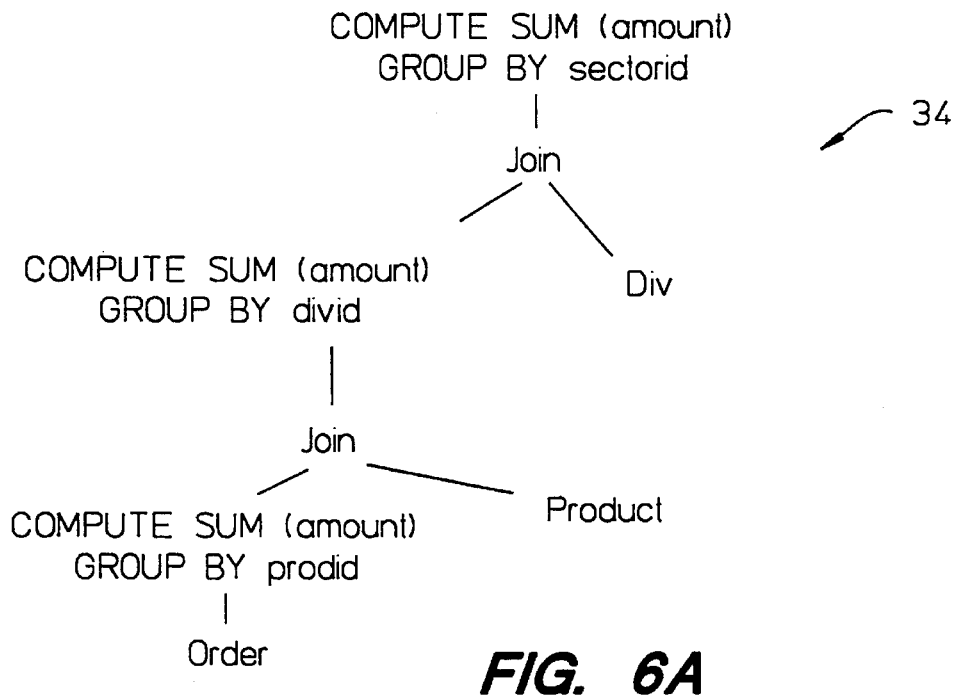
FIGS. 6A and 6B are schematic diagrams of representative extended left-deep join trees for the join tree illustrated in FIG. 5.
Figure 6B:
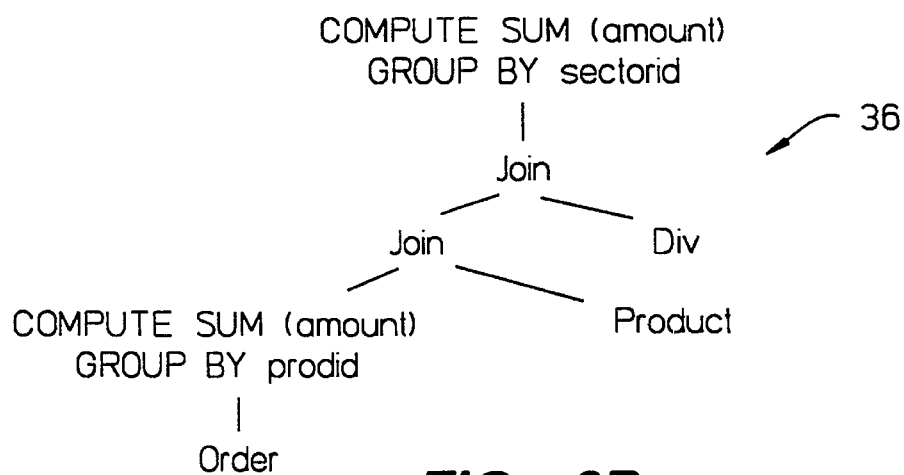

In contrast to invariant grouping, multiple applications of the group-by operation along a chain of nodes are not redundant but results in performing the grouping in stages. For example, FIG. 5 is a schematic diagram for a left-deep tree for the second representative query Q2. Thus, tree 32 is a conventional execution plan of the query Q2. Although the node Order of tree 32 does not have the invariant grouping property, the node Order does satisfy the simple coalescing grouping property because the aggregating column of the query (amount) is also a candidate aggregating column of Order and the aggregating function Sum does satisfy the union property. Consequently, the trees 34 and 36 shown in FIGS. 6A and 6B are equivalent to the tree 32 in FIG. 5. The multiple applications of grouping are not redundant but used to successively compute the sum of orders.

There are important relationships among the transformations that offer opportunity for optimization. For example, a node with the invariant grouping property is a special case of a node with simple coalescing grouping property. Therefore, if a group-by operation introduced by a simple coalescing transformation is placed at an invariant grouping node, then the properties of invariant grouping can be used to eliminate redundant group-by operations, if any.

Finally, notice that simple coalescing has the remarkable property that whether a node satisfies this property can be tested "locally" independent of remaining joins. This property is exploited in the optimization procedures of the invention using the above transformations.

Figure 7A:
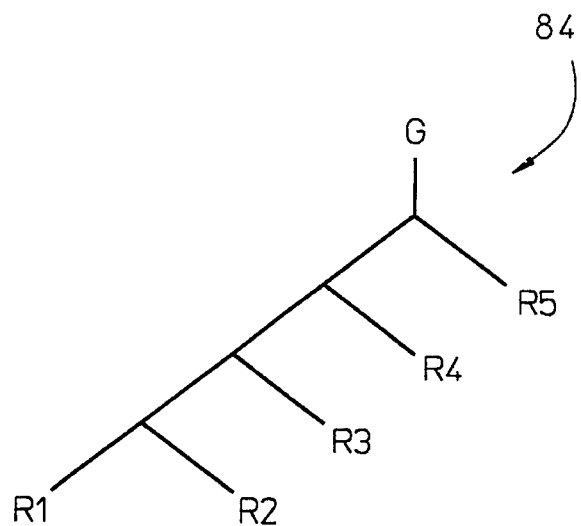
FIGS. 7A–7C are schematic diagrams of left-deep join trees illustrating applicability of transformations.
Figure 7B:
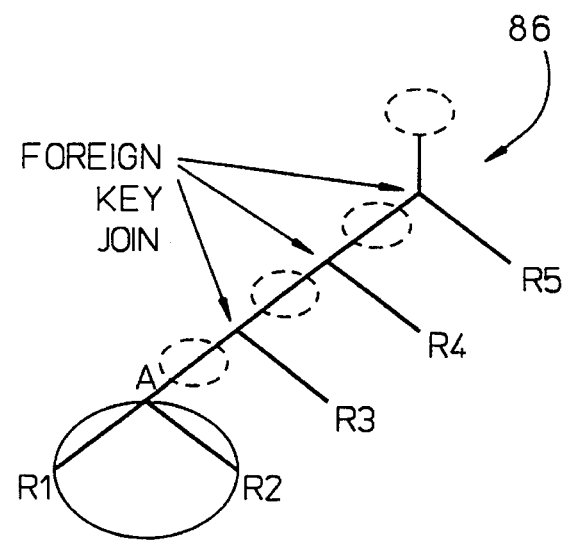
Figure 7C:
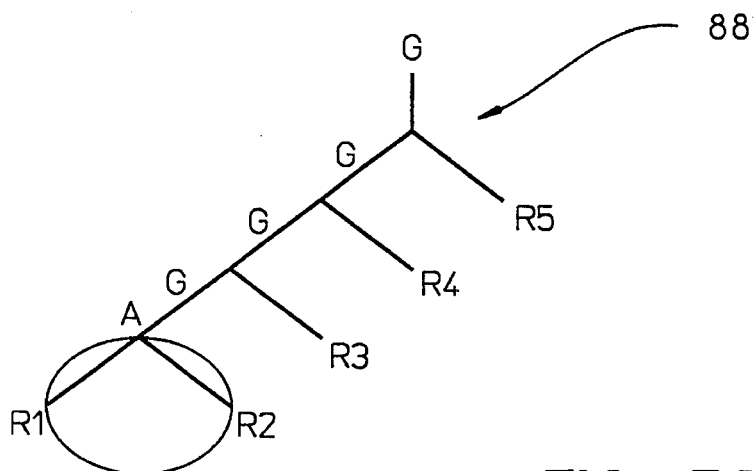

FIGS. 7A–7C illustrate the applicability of the transformations on a left-deep join tree. The schematic diagram of a join tree 84 shown in FIG. 7A is that produced by a conventional optimizer. The join tree 84 represents a left-deep tree obtained by a traditional optimizer. The nodes marked G represent an application of group-by operation. As is conventional, the group-by operation shown in FIG. 7A is performed last. FIG. 7B illustrates a schematic diagram of a join tree 86 showing application of the first transformation. The circled subtree marked A denotes that all aggregating columns of the query occur below that node. The join tree 86 represents a tree where there is a chain of nodes (dotted circles) where invariant grouping property holds. The dotted circles indicate that the group-by operation may be placed in only one of the dotted nodes. FIG. 7C is a schematic diagram of a join tree 88 showing application of the second transformation. The join tree 88 denotes a tree where nodes have simple coalescing grouping property and thus multiple group-by operations may appear along a chain.

Note that although the transformations have been described in the context of left-deep trees, the transformations apply to bushy annotated join trees as well with obvious generalizations. Further, the SQL built-in aggregates functions Max, Min and Sum considered above apply to all of the transformations.

Let us also consider our earlier assumption that in the query the aggregates on columns are qualified by All (e.g., Sum All amount)). Qualifier All is the default specification in SQL. This restriction is easily relaxed. First, note that the invariant grouping transformation is applicable on aggregates qualified by Distinct as well. Next, for simple coalescing, if there are aggregates in the query with Distinct qualifiers, the Distinct columns can be considered as part of the group-by columns of the query from the point of view of the transformations. Thus, while aggregates on these columns are not computed during an early grouping, aggregates that have the qualifier All can be computed using our transformations.

Also, note that an invocation of a group-by operator is redundant if the set of required columns functionally determines the rest of the columns. In such a case, each group is a singleton. The optimizer is designed to recognize this in estimating cost of a plan. Although not described above, the transformations also apply to queries having an Order-by or Having operator.

Figure 8:
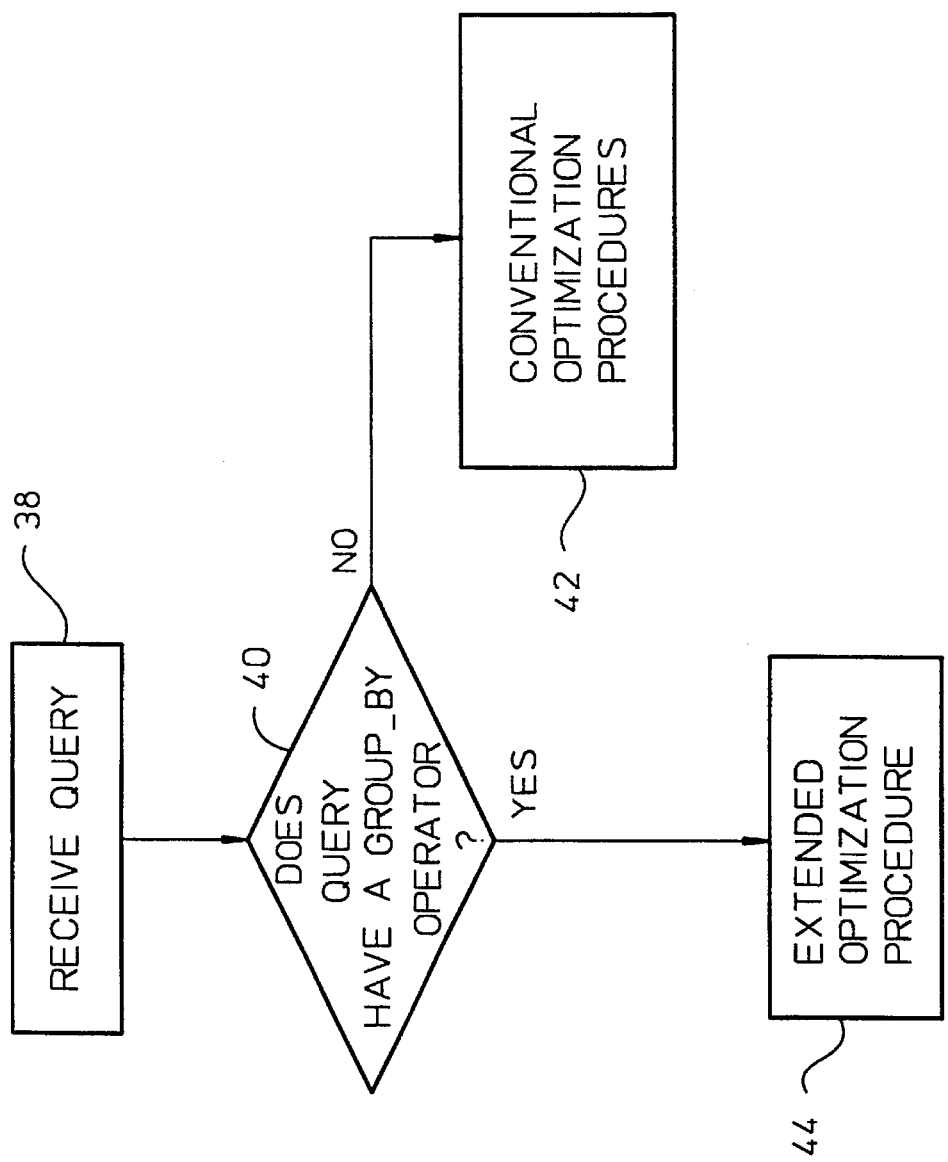
FIG. 8 is a flowchart illustrating basic operations of an optimizer according to the invention.

FIG. 8 is a flowchart illustrating basic operations of the optimizer 12 according to the invention. The optimizer 12 initially receives 38 a query 10 to be processed. The optimizer 12 then determines 40 whether or not the received query 10 includes a group-by operator. If the received query 10 does not include a group-by operator, then conventional optimization procedures 42 are performed. On the other hand, if the received query 10 is determined 40 to have a group-by operator, then extended optimization procedures 44 are performed according to the invention. The conventional optimization procedures 42 are not further discussed because they are known and not part of the invention. The extended optimization procedures 44 are described in detail below with reference to FIGS. 7–9.

Generally speaking, the optimizer 12 receives a query having a group-by operator, produces a series of alternative execution plans (execution space) using transformations, and then selects an optimal plan from the alternative execution plans using a cost-based approach. Given this overall operation of the optimizer 12, the details of the extended optimization procedures 44 are hereafter described.

For optimization efficiency, the execution space is restricted to be the class of left-deep join trees. Left-deep join trees are annotated join trees where the right child of every internal node is a leaf.

Figure 9:
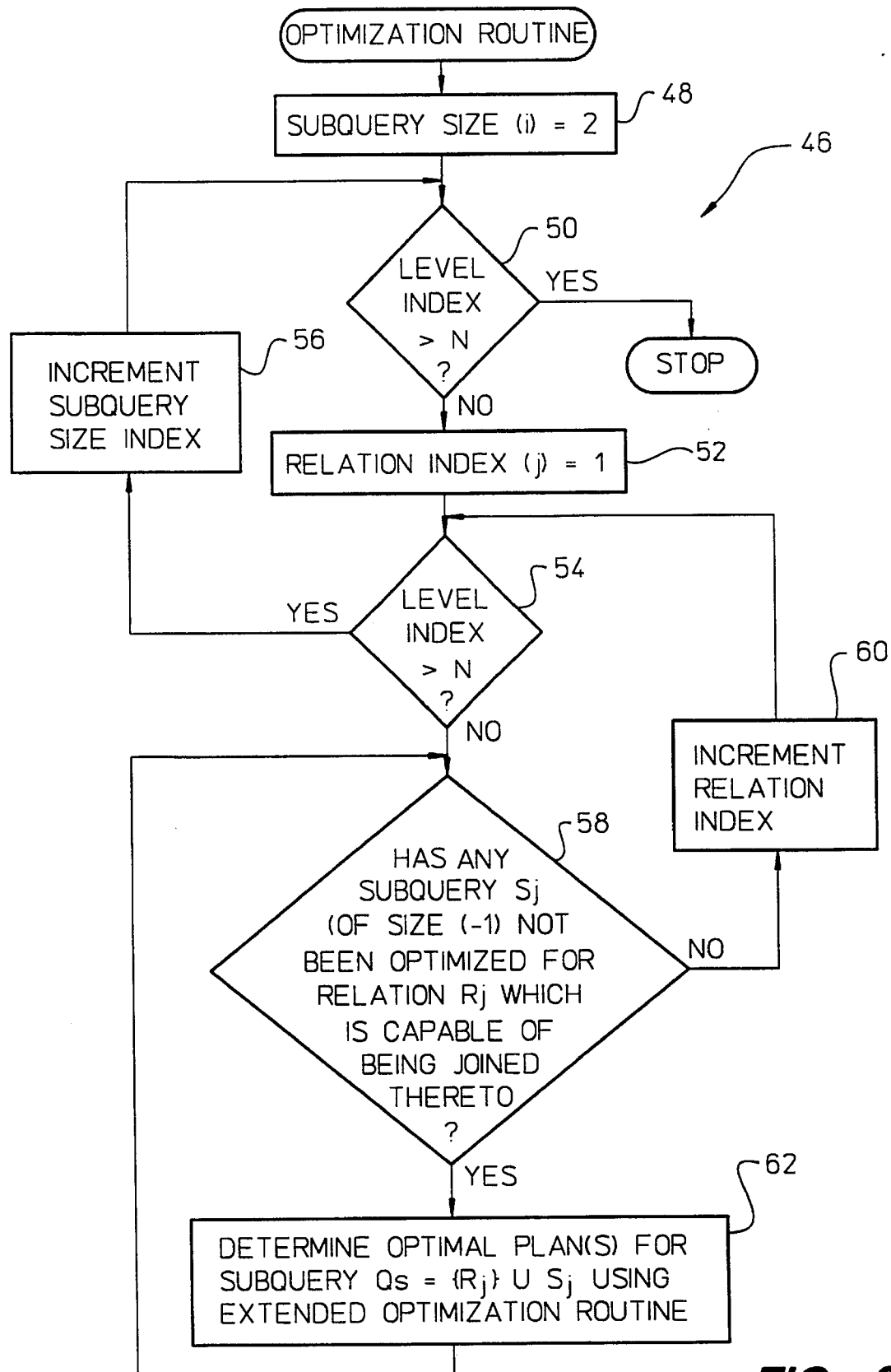
FIG. 9 is a flowchart illustrating basic operations associated with an optimization routine according to an embodiment of the invention.

FIG. 9 is a flowchart illustrating a basic optimization routine 46 associated with the extended optimization procedures 44, described for queries with at least one join. The optimization routine 46 initially sets 48 an index(i) corresponding to subquery size to two. When the subquery size is set to i, the optimizer 12 optimizes subqueries of the given query that consist of i of the relations mentioned in the query. Thus, the maximum subquery size could be the number of relations in a given query (N). Hence, a decision 50 is then made based on the magnitude of the subquery size level. If the subquery size exceeds N, then the decision 50 causes the optimization routine 46 to end. On the other hand, if the subquery size does not exceed N, then decision 50 allows the optimization routine 46 to increment the subquery size.

Thereafter, for each value of the subquery size, iterations are performed for values of relation index (j), initially set 52 to one. In general, the relation index will vary from 1 to N+1, N being the number of relations in the query. Thereafter, a decision 54 is made based on the magnitude of the relation index. If the relation index exceeds N, then the decision 54 determines that optimization for the particular subquery size (i) is completed. In this case, the subquery size is incremented (i+1) 56 and then processing flow returns to block 50 for processing of subqueries of size i+1. On the other hand, when the relation index does not exceed N, then a decision 58 is made based on whether optimal plans for join of Rj with all subqueries Sj (of size i–1) have been considered. If so, then the relation index is incremented 60 and processing flow returns to block 54 for processing of the next relation (Rj+1). On the other hand, if the decision 58 determines that all subqueries Sj have not yet been optimized with the relation Rj, then optimal plan(s) for subquery Qs={Rj} ⋈ Sj (⋈ refers to a join operation) are determined 62 using an extended optimization routine. The extended optimization routine is described in detail below with reference to FIG. 10. Following block 62, processing flow returns to decision block 58. As a result, blocks 58–60 repeat until decision block 58 determines that all the subqueries Sj have been optimized with the relation Rj.

Figure 10:
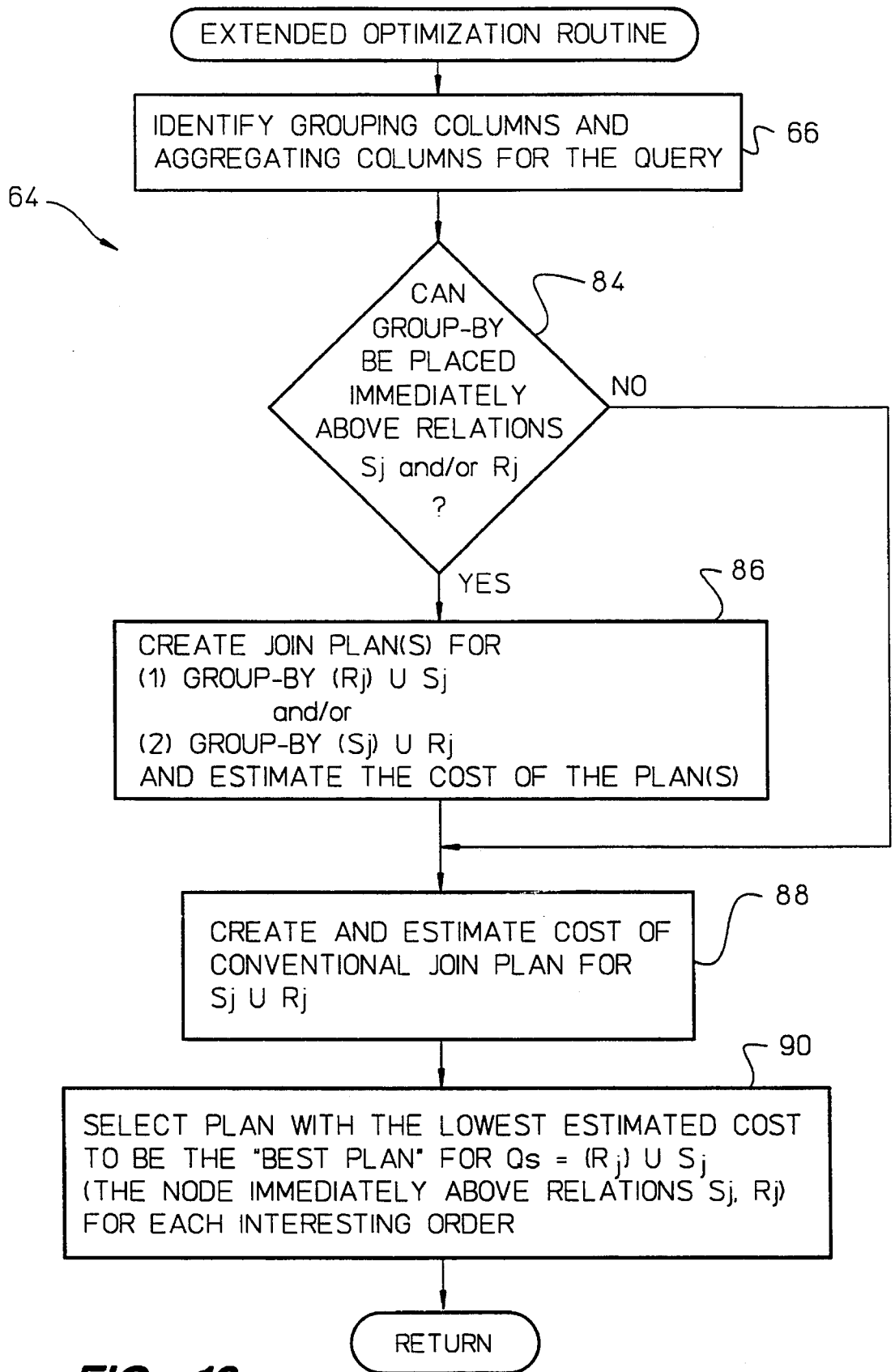
FIG. 10 is a flowchart of a representative extended optimization routine according to the invention.

FIG. 10 is a flowchart of an extended optimization routine 64 in accordance with an embodiment of the invention. Recall that the extended optimization routine 64 generates an optimal plan for Qs, i.e., for the join between Sj and Rj. The extended optimization routine 64 begins by identifying 66 grouping columns and aggregating columns for the query 10.

Given the constraints on where the group-by operation can be placed in an annotated join tree (discussed above), equivalent join trees are produced during this optimization. A decision 84 is then made based on whether a group-by operation can be placed immediately above relations $S_j$ and/or $R_j$ (i.e., whether either Rj or Sj satisfy the simple coalescing property). If a group-by operation can be placed immediately above relations $S_j$ and/or $R_j$, then block 86 causes join plan(s) to be created and the cost of the plans estimated. The join plan(s) are as follows:

(1) GROUP-BY (Rj) ⋈ Sj (2) GROUP-BY (Sj) ⋈ Rj

Such join plans will be called group-by join plans because a group-by operation precedes a join operation. The group-by join plans are produced by inserting a group-by operation into the query tree immediately above relations Sj and/or Rj. In effect, the insertion of the group-by operation into the tree at an internal node causes a join operation to be replaced with a group-by join operation. If a group-by operation cannot be placed immediately above relations $S_j$ and/or $R_j$, then block 86 is bypassed. Next, regardless of whether block 86 is bypassed, block 88 causes a conventional join plan for Sj ⋈ Rj to be created and its cost estimated. The conventional join plan is produced using conventional techniques such as described in Selinger P. G. et al., supra.

For example, with reference to FIG. 2, the tree 20 is a left-deep join tree for a query. The tree 20 includes a node Order which has the simple coalescing grouping property since the required columns {dealerid, prodid} and the candidate aggregate column {amount} matches the grouping columns and the aggregating columns of the query. Thus, during the optimization, the decision 84 in FIG. 10 would conclude in the case of tree 20 (FIG. 2) that a group-by operation could be placed above node Order.

Cost estimation for the group-by join plans is now described in detail. The cost of the conventional join plan follows conventional techniques, see e.g., Selinger P. G. et al., supra. The cost of the group-by join plan(s) (if available) can be estimated by the following extension to a conventional cost model.

The extension to the cost model is to estimate the number of tuples of the relation after grouping. For a single column grouping, the number of groups is equal to number of distinct values in the column. However, for multi-column grouping, an estimate of the number of groups needs to be computed.

One possible cost model (cost-model multi) uses the following formula:

Cost-Model Multi: It is assumed that the grouping columns are independent. The number of distinct values are estimated to be the minimum of the following two quantities: (a) Number of tuples in the relation; and (b) Product of the number of unique values in the grouping columns.

However, in practice, smaller number of groups are more realistic than those predicted by the above cost model. Thus, cost model multi has the effect of discouraging grouping since the model predicts relatively large number of groups based on the independence assumption. The above cost model is chosen to be conservative so that if an early group-by operation is preferred under this cost model, it is likely to be preferred "overwhelmingly".

Another possible cost model (cost-model max) is "optimistic", i.e., predicts fewer groups, and uses the following formula:

Cost-Model Max: The number of distinct values is assumed to equal the maximum value of the cardinality among all the grouping columns. In other words, the columns have a "hierarchical" structure.

In such a model, grouping is encouraged.

Again, returning to FIG. 10, the final procedure in the extended optimization routine 64 is to select 90, from the alternative plans, the plan with the lowest estimated cost. The plan selected 90 is the "best plan" for Qs={R j} ⋈ Sj (the node immediately above relations Sj, Rj) for each interesting order, described briefly below.

An interesting order is an ordering of tuples of the intermediate relation that may be useful later either (a) if the ordering is the same as that specified in a group-by clause of the query or (b) if the ordering is useful in a future sort-merge join. The set (b) consists of all future join columns. As in conventional optimization procedures, the optimizer 12 generates interesting orders that result due to taking into account all the access paths and join methods while considering a join between two relations (or between an intermediate relation and a base relation).

As in traditional optimizers, the conventional sets of interesting orders are utilized. However, as part of the innovation, a key observation is that the group-by nodes can (in accordance with the present invention) occur internally and can have multiple grouping columns, it is beneficial to choose an appropriate major-to-minor ordering of grouping columns if the group-by operation is implemented using sorting.

To reduce the set of interesting orders as above, the major-to-minor ordering of columns (i.e., most-significant to least-significant) are preferably restricted such that one of the following conditions are satisfied:

(1) The most significant columns are the columns for sort-merge join columns in the node immediately above the group-by node.

(2) The most significant columns are the grouping columns of the query, if such grouping columns are present among the columns of the node.

As in conventional optimization procedures, the first interesting order (1) ensures that the order will be useful in the join that follows a group-by operation. Therefore, the only additional order created due to a group-by operation is the second interesting order (2). The reason the second interesting order (2) is advantageous is because in the presence of the above ordering, if the outer relation always participates in nested loop in the future joins, then sorting will probably not be needed in the future group-by operations. In the conventional optimization procedure, if the columns in second interesting order (2) disagreed with first interesting order (1), then such an interesting order for sorting would be unattractive since the cost of the immediate join can be much higher (due to the overhead of sorting which is not exploited in the succeeding join). However, in case of early processing of group-by operations, the possible reduction in the size of the relation being joined makes exploring ordering in the second interesting order (2) advantageous.

As an example, consider the following join-order for a query (left to right) ((R join S) join T). There is a equi-join on column a between R and S and on column c between S and T. The result is grouped on column b of R. The details of the aggregating columns are not relevant. In considering the first join, in a conventional system, the major column for sorting would be column a (first interesting order (1)). However, if a group-by operation is pushed down on R preceding the join with S, then, column b is also considered as the major column for sorting since column b is the grouping column (second interesting order (2)).

Finally, the optimal plan is examined for simple coalescing group-by nodes that can be converted invariant group-by nodes. Such post-processing helps detect redundant group-by operations (since multiple applications of invariant group-by operations are redundant).

Although the above-described embodiments of the invention have been concerned with group-by operators, the inventive techniques for optimizing database queries are also useful in queries having Select Distinct operators, as the latter can be viewed as a special case of group-by operators. Such queries have the following form:

Select Distinct <columnlist>

From <tablelist>

Where cond1 ... condn

The presence of a Select Distinct clause allows us to remove duplicate tuples in the answer or in the intermediate relations created during query processing. Selectively pushing down duplicate elimination operations past join operations can result in the reduction of the cost of processing Select Distinct queries for select-project-join expressions that have no group-by operators. However, as in the case when pushing down group-by operations past joins, the decision to push down duplicate elimination operation interacts with the join order.

Duplicate elimination can be viewed as a special case of grouping where no aggregates are computed and the group-by operation is on all columns of the projection list. In particular, duplicate elimination operation may be pushed down to any node of the annotated join trees. Moreover, application of such grouping to multiple nodes is not redundant. Thus, duplicate elimination is modeled as a simple coalescing grouping property (second transformation). Note that simple coalescing grouping property is trivially satisfied for Select Distinct queries for all nodes in any left-deep trees since there are no aggregating columns.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for optimizing a query for a relational database, said method comprising:

(a) receiving a query to be optimized for processing, the query having a group-by operator; and (b) generating query execution plans having a root node, relations which are joined at nodes and nodes representing group-by operations placed preceding every internal join node for which placement of a group-by operation generates an execution plan equivalent to an execution plan having the group-by operation at the root node, wherein each said group-by operation performs a group-by operation on one of said relations, by:

(b1) identifying grouping columns and aggregate columns for the query; and (b2) determining, based on the grouping columns and the aggregate columns for the query, whether a node representing a group-by operation can be placed preceding the join nodes of the execution plan;

(c) estimating cost for each execution plans; and (d) choosing the execution plan having the lowest estimated cost.

2. A method as recited in claim 1, wherein said determining step (b2) comprises:

determining whether the remaining join operators are on foreign keys; and determining whether aggregate functions of the query satisfy a union property.

3. A method as recited in claim 1, wherein said determining step (b2) further comprises:

identifying candidate aggregating columns for the join node;

determining whether the candidate aggregating columns are a subset of the aggregating columns of the query, and if the candidate aggregating columns are not a subset of the aggregating columns of the query (72):

indicating that no transformation of placing a group by operation prior to the join node is available (74); otherwise, determining whether remaining join operations are with foreign keys, and if the remaining join operations are with foreign keys (76):

determining whether the required columns are a subset of the grouping columns of the query, and if the required columns are a subset of the grouping columns of the query (77):

indicating that the invariant property exists and that a group by operation transformation is available (78); otherwise, indicating that no group by transformation is available; and if the remaining join operations are not with foreign keys:

determining whether the aggregate function satisfies the union property, and if the aggregate function does satisfy the union property (80):

indicating that a simple calescing grouping property exists and that a group by operation transformation is available (82); otherwise, indicating that no group by operation transformation is available.

4. A method as recited in claim 1, wherein said generating step (b) further comprises:

(b3) generating, for every join node being a join (⋈) of a first relation (R) and a second relation (S), the execution plans for Group-By (R[j]) ⋈ S[j] and Group-By (S[j]) ⋈ R[j].

5. A query optimizer for a database management system, said system comprising:

a relational database;

means for receiving a query to be optimized, the query including a group-by operator associated with at least one of the nodes of the query;

means for considering query execution plans for the query having a root and nodes representing group-by operations placed preceding internal join nodes wherein such execution plans are equivalent to an execution plan having the group-by operation at the root;

means for estimating cost for the execution plans; and means for choosing the execution plan based on the estimated cost.

6. A system as recited in claim 5, wherein said considering means further comprise:

determination means having:

means for identifying grouping columns and aggregate columns for the query; and means for determining, based on the grouping columns and the aggregate columns for the query, whether the join nodes of the execution plan can be preceded by nodes representing group-by operations.

7. In a relational database management system having a query optimizer which optimizes execution of a query, wherein the relational database management system operates to control a computer, wherein the improvement comprises optimizing a query which includes a group-by operator by selecting an execution plan for the query from a set of execution plans including execution plans having group-by operations at internal nodes, wherein each such execution plan has a root node, relations which are joined at nodes and nodes representing group-by operations placed preceding event internal join node for which placement of a group-by operation generates an execution plan equivalent to an execution plan having the group-by operation at the root node, wherein each said group-by operation performs a group-by operation on one of said relations, by:

identifying grouping columns and aggregate columns for the query; and determining, based on the grouping columns and the aggregate columns for the query, whether a group-by operation can be placed preceding the join nodes of the execution plan.

* * * * *